United States Patent [19]

Tsuyama

[11] Patent Number: 4,510,557
[45] Date of Patent: Apr. 9, 1985

[54] HEADLAMP DEVICE FOR BICYCLE, MOTORCYCLE AND THE LIKE

[75] Inventor: Sadaharu Tsuyama, Osaka, Japan

[73] Assignee: Tsuyama Mfg. Co., Ltd., Japan

[21] Appl. No.: 543,309

[22] Filed: Oct. 19, 1983

[51] Int. Cl.³ .............................................. F21L 9/00
[52] U.S. Cl. ..................................... 362/188; 362/191;
362/193; 362/72; 362/197; 362/285; 362/368;
362/375; 362/296; 362/310; 313/281
[58] Field of Search ........................ 362/72, 188–197,
362/199, 285, 296, 310, 368, 375; 313/271, 281

[56] References Cited

U.S. PATENT DOCUMENTS

| | | | |
|---|---|---|---|
| 3,473,072 | 10/1969 | Ivanov et al. | 313/281 X |
| 3,736,456 | 5/1973 | Middlehoek et al. | 313/271 X |
| 3,875,397 | 4/1975 | Nicholl | 362/188 |
| 4,388,673 | 6/1983 | Maglica | 362/188 X |

FOREIGN PATENT DOCUMENTS 2082746  3/1982  United Kingdom ................ 362/188

Primary Examiner—Peter A. Nelson
Attorney, Agent, or Firm—Allegretti, Newitt, Witcoff & McAndrews, Ltd.

[57] ABSTRACT

A headlamp device for bicycles and like vehicles, which includes a reflector, a bulb having its end fixedly inserted through an opening formed in said reflector, an illumination covering mounted on the front face of said reflector, and a battery casing attached integrally to the rear portions of these members. The improvement comprises an outwardly extending locking piece affixed to said end of said bulb, a cylindrical extension for the insertion of said end of said bulb provided to the rear edge of said opening in said reflector, and the rear periphery of said cylindrical extension being stepped to define locking portions differing in axial length, said locking portions being engaged within said locking piece, whereby, when said bulb is fixedly inserted into said opening in said reflector, said locking piece can selectively be locked onto said locking portions differing in axial length.

7 Claims, 7 Drawing Figures

HEADLAMP DEVICE FOR BICYCLE, MOTORCYCLE AND THE LIKE

BACKGROUND OF THE INVENTION

The present invention relates to a headlamp device for bicycles, motorcycles and like vehicles, which is particularly designed to be used for a bulb, powered from a dynamo or from a battery.

Recently, headlamps have been introduced for bicycles and like vehicles adapted to derive power from one or two power sources, such as a dynamo and a battery. However, there is a problem in connection with the positioning of the bulb with respect to the reflector or socket in such headlamp. When the power source is a dynamo of 6 V or a battery of 2.5 V, it is required to use a bulb different in size. Accordingly, when there is no means for adjusting the central position of the bulb filament in a reflector or socket, there is a variation in the axial length of the bulb. When the position of the filament of the bulb is adjusted to be at the focal point of a concave reflected for one size bulb, the light from the bulb proceeds in parallel after being reflected by the reflector and reaches an illumination covering. In such a stae, normal illumination can be achieved. When there is no means for adjusting the position of the bulb filament in the reflector or socket and a larger size bulb is used, the position thereof is out of focus of the reflector, and no normal illumination can be achieved.

To prevent this, it has been proposed to adjust the distance by which the bulb is screwed into the central position of the reflector. With such procedure, however, it is not possible to correctly regulate the axial length of the bulb. In addition, when the bulb is screwed into the reflector an insufficient distance problems arise, such as unstable holding and rattling of the bulb, and poor electrical contact.

SUMMARY OF THE INVENTION

An object of the present invention is to provide a solution to the above-mentioned problems.

It is therefore a main object of the present invention to make it possible to vary the axial length of a bulb within a reflector with a simple structure.

More specifically, the present invention provides a headlamp device for bicycles and the like vehicles, which includes a reflector, a bulb having its end fixedly inserted through an opening formed in said reflector, an illumination covering mounted on the front face of said reflector, and a battery casing attached integrally to the rear portion of these members, wherein: an outwardly extending locking piece is provided on said end of said bulb, a cylindrical extension for the insertion of said end of said bulb is provided on the rear edge of said opening in said reflector, and the rear periphery of said cylindrical extension is stepped to define locking portions differing in axial length, said locking portions being engaged within said locking piece, whereby, when said bulb is fixedly inserted into said opening in said reflector, said locking piece can selectively be locked onto said locking portions differing in axial length.

BRIEF DESCRIPTION OF THE DRAWINGS

The present invention will now be explained in detail with reference to the accompanying drawings, in which like numerals in the various views pertain to like elements and in which.

DETAILED DESCRIPTION OF THE PREFERRED EMBODIMENTS

Figure 1:
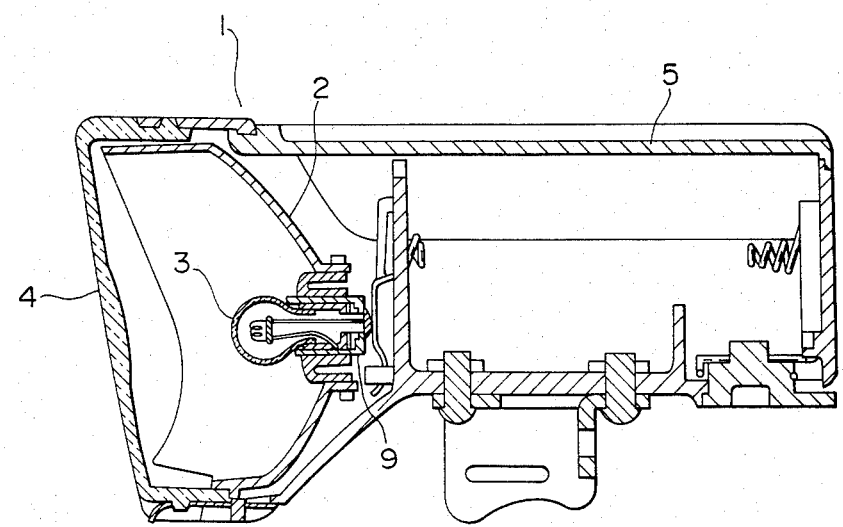
FIG. 1 is a longitudinal cross section view showing the overall arrangement of the headlamp device according to the present invention.

Referring now to FIG. 1, a headlamp device generally shown at 1 mainly includes a reflector 2, a bulb 3 attached to the reflector 2, an illumination covering 4 made up of a lens attached to the front face of the reflector 2 and a battery casing 5 fixedly mounted on the rear portions of these members. Suitable bracket means may be affixed to the headlamp device 1 to secure the handlamp device to the handlebars of a bicycle.

Figure 2A:
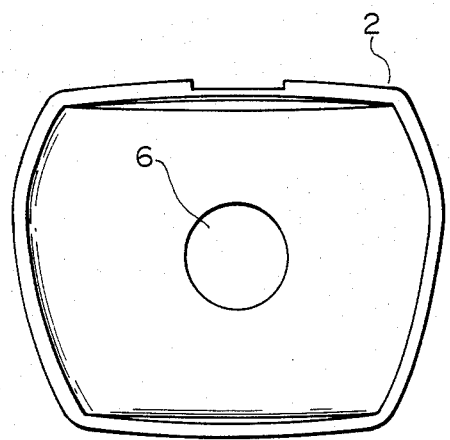
FIG. 2A is a front view of the reflector used in the present invention.
Figure 2B:
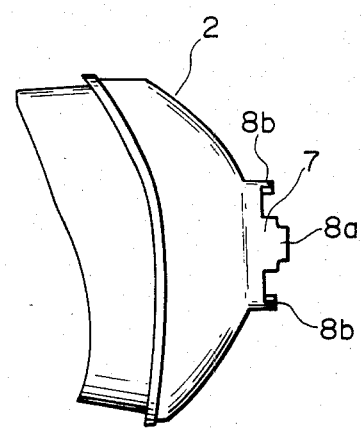
FIG. 2B is a side view of the reflector.
Figure 2C:
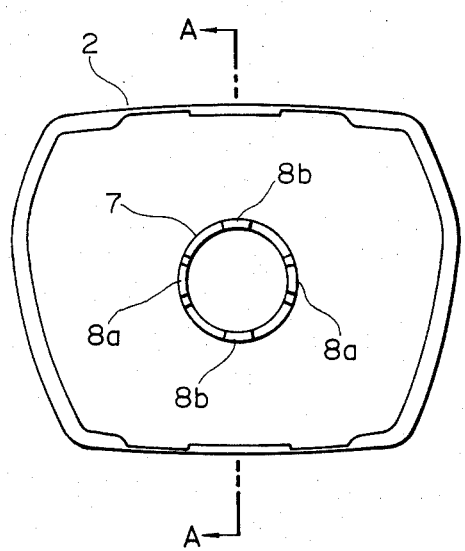
FIG. 2C is a rear view of the reflector.
Figure 2D:
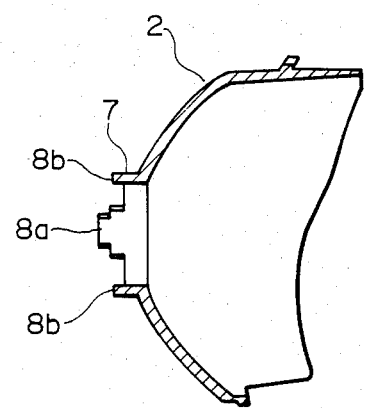
FIG. 2D is a longitudinal cross section view of the reflector.

As illustrated in FIGS. 2A, 2B, 2C and 2D, the reflector 2 is formed of a suitable plastic, plated with metal on its surface, and bent or formed to define a concave mirror. The reflector 2 is also provided in its recessed center portion with an opening 6 through which the bulb 3 is mounted in place. A cylindrical extension 7 for mounting of the bulb is integrally attached to the rear edge of the opening 6. The rear periphery of the extension 7 is stepped to define two pairs of locking portions 8a, 8a and 8b, 8b differing in axial length. As best seen in FIGS. 2(B) and 2(D), the locking portions 8a, 8a are longer than the locking portions 8b, 8b. The projections from the cylindrical extensions which define each pair of locking portions 8a, 8a and 8b, 8b are in opposed relation.

Figure 3A:
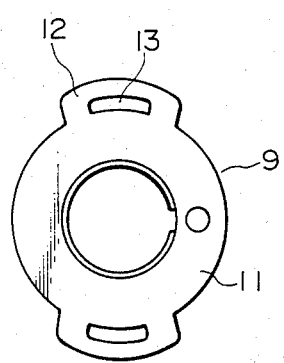
FIG. 3A is a front view of the locking member used in the present invention.
Figure 3B:
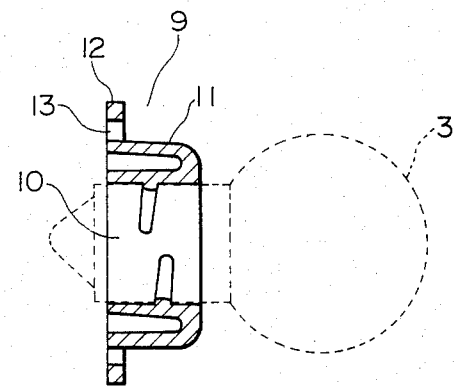
FIG. 3B is a longitudinal cross sectional view of the locking member.

A locking member 9 illustrated in FIG. 3A is attached to the end of the bulb 3 in the manner illustrated in FIG. 3B. The locking member 9 comprises a plate 11 into which the end 10 of the bulb 3 is screwed and a pair of locking pieces 12 projecting outwardly from the plate 11 in opposite directions. If desired, a bayonet-type connection can be used to affix the bulb 3 to locking member 9. The locking pieces or projections 12 are provided with openings 13, the form of which is in agreement or complementary with that of the locking portions 8a and 8b.

To attach the bulb 3 to the reflector 2, the bulb 3 to which the locking member 9 has been attached in advance is inserted into the opening 6 through the extension 7. It is noted that the outer diameter of the plate 11 forming a part of the locking member 9 is substantially equal to the inner diameter of the cylindrical extension 7 so as to eliminate any gap therebetween. The bulb 3 is forced in until the locking portions 8a, 8a or 8b, 8b are inserted into the openings 13 in the locking pieces 12. Selection of the locking portions may be made depending upon the type of the bulb to be used. For example, when using a bulb for a dynamo having a considerable length, the locking portion 8a, 8a each having a longer axial length are used. When using a bulb for a dry cell or dry cells having a shorter length, the locking portion 8b, 8b, each having a shorter axial length, are employed. In one preferred embodiment, one pair of locking portions is different in axial length from the other by about 3 mm, so that the filament of the bulb, whether for a dynamo or for a battery, is located at the focal point of the reflector.

While the foregoing embodiment has been described as an arrangement wherein the locking portions differing in axial length are inserted into openings formed in the locking pieces, it is understood that the locking portions may be recessed to receive the locking pieces, and the openings in the locking pieces are then dispensed with.

In accordance with the present invention as described above, it is easy to locate the filament of the bulb, whether for a dynamo or for a battery, at the focal point of the reflector, so that normal illumination is invariably achieved. In addition, the arrangement according to the present invention is of great utility in that it is of a simple structure and enables easy conversion.

While the present invention has been explained with reference to a specific embodiment, it is understood that the invention is not limited thereto, and many changes or modifications may be made without departing from the spirit of the invention as defined in the appended claims.

I claim:

1. A headlamp device for bicycles and the like vehicles, which includes a reflector, a bulb having its end fixedly inserted through an opening formed in said reflector, an illumination covering mounted on the front face of said reflector, and a casing attached integrally to the rear portions of these members, the improvement comprising an outwardly extending locking piece affixed to said end of said bulb, a cylindrical extension for the insertion of said end of said bulb is provided to the rear edge of said opening in said reflector, and the rear periphery of said cylindrical extension is stepped to define locking portions differing in axial length, said locking portions being engaged within said locking piece, there being two pairs of locking portions, each pair being of different axial length, whereby, when said bulb is fixedly inserted into said opening in said reflector, said locking piece can selectively be locked onto said locking portions differing in axial length.

2. A headlamp device as in claim 1 wherein said bulb is of a first predetermined length for one power source and a second predetermined length for a second power source, and said bulb may be positioned at the focal point of the reflector regardless of power source.

3. A headlamp device as in claim 2 wherein the one power source is a dynamo.

4. A headlamp device as in claim 2 wherein the second power source is battery means.

5. A headlamp device as in claim 4 wherein the battery means are carried in said casing.

6. A headlamp device as in claim 1 wherein the locking piece includes slotted openings complementary to the locking portions for receiving selected locking portions.

7. A headlamp device as in claim 1 wherein each pair of locking portions comprises opposed projections on said cylindrical extension.

* * * * *